REDUCED BANDWIDTH BINARY PICTURE TRANSMISSION

Filed Feb. 11, 1963

4 Sheets-Sheet 1

FIG. I

INVENTOR,
BERNARD LIPPEL

BY Julian C. Keppler

ATTORNEY.

REDUCED BANDWIDTH BINARY PICTURE TRANSMISSION

Filed Feb. 11, 1963

4 Sheets-Sheet 2

INVENTOR,
BERNARD LIPPEL

BY Julian C. Keppler

ATTORNEY

INVENTOR,
BERNARD LIPPEL
BY Julian C. Keppler
ATTORNEY.

REDUCED BANDWIDTH BINARY PICTURE TRANSMISSION

Filed Feb. 11, 1963 4 Sheets-Sheet 4

INVENTOR,
BERNARD LIPPEL

BY Julian C. Keppler

ATTORNEY.

United States Patent Office 3,377,423

Patented Apr. 9, 1968

3,377,423

REDUCED BANDWIDTH BINARY PICTURE TRANSMISSION

Bernard Lippel, West Long Branch, N.J., assignor to the United States of America as represented by the Secretary of the Army Filed Feb. 11, 1963, Ser. No. 257,800
9 Claims. (Cl. 178—6)

The invention described herein may be manufactured and used by or for the Government for governmental purposes without the payment of any royalty thereon.

This invention concerns television transmission with digital signals accomplished in a manner which conserves bandwidth or transmission-channel capacity, but has various other applications, e.g., facsimile.

A television camera scanning the image stored therein generates an electrical video signal which is a function of time containing all the required picture information. The bandwidth required to transmit said video signal is determined by the vertical resolution to be provided, expressed in lines per picture, the usually equivalent horizontal resolution, and the temporal resolution, expressed in frames per second. Standard television transmissons in the United States, assumed hereafter for comparison, include 525 lines per picture and 30 frames per second, for which a 4 mc./sec. channel is provided. As is well known to those skilled in the art, this line rate and frame rate may be shown to correspond (during active scan of an ideal picture) to scanning approximately eight million resolution elements per second, requiring the above-mentioned 4 mc./sec. bandwidth. It can be demonstrated that the 30/sec. frame sampling rate is really in excess of that required to transmit the perceptible motion or rate of change of picture; however, with conventional receiving apparatus, even 30 pictures per second would often result in objectionable flicker, requiring the use of two-to-one interlace therewith, to produce 60/sec. flicker rate.

It is often desirable to encode television video signals in digital form, particularly binary form, for transmission over digital communication links, which have advantages well known to the art. However, the most obvious method of binary coding, pulse code modulation such as conventionally used on speech or telemetry signals, requires the use of extremely large bandwidth. Specifically, if the video amplitude is encoded with $k$ bits, then $k$ bits are transmitted for each resolution element, requiring $8k$ megabits/sec. and at least $4k$ megacycles/sec. if the picture is not to be degraded when binary signals are sent. The number $k$ of code bits provided by the analog to digital converter expresses the brightness resolution (a maximum of $2^k$ levels), while the number of bits/sec. transmitted over the channel defines the necessary channel capacity. Most workers have provided about seven bits amplitude coding (equivalent to a channel capacity of 56 megabits/sec.), merely to avoid the appearance of artificial contour on gradually shaded picture areas; other approaches, which avoid sharp lines of demarcation (contours) resulting from excessively sharp quantizing in the analog to digital converter, may require only four or five bits (i.e., 32–40 megabits/sec.), which also corresponds approximately to the required number of discriminable brightness values (i.e., 16 to 32 brightness levels). For comparison to the 4 mc. analog bandwidth noted before, this may be designated as 28 mc. bandwidth. Since the digital nature of the signal permits much greater interference rejection the cost in increased bandwidth is partially compensated. The technique here proposed will minimize the increased bandwidth while also allowing digital operation, to provide the advantages of interference rejection without substantially increased bandwidth.

Prior art pulse code modulation systems as well as the present invention employ analog to digital converters for the video signal. Unlike such prior art this invention interrelates resolution in brightness with horizontal and vertical resolution, so that the number of bits transmitted per resolution element may be considerably less than $k$, the number of code bits provided by the converter. In some embodiments the invention also interrelates the resolution of rate of movement, ordinarily determined by the frame rate, and in some embodiments the average number of bits transmitted per resolution element is fixed, regardless of $k$. Although employed for comparison purposes in relation to the prior art, the concept of sampling distinct horizontal resolution elements has been found less helpful than the bit map concept used below.

This invention is typical of a class of techniques which conserve channel capacity by discarding subjectively unimportant information. There is another approach to channel economy, often called statistical coding, which removes redundancy but not information content from the transmitted signal. Although, in principle, statistical coding could be performed on analog video, in practice, digitized video is almost always required. Some embodiments of the present invention provide an output particularly well suited to subsequent statistical recoding by prior art techniques for further economy in transmission.

The invention will be described as applied to the transmission of binary (i.e., two-valued) signals, but the manner whereby it can be modified for transmission of other digital signals, having more than two signal values, will be abundantly clear to those skilled in the art.

In accordance with the invention the electrical video signal from a television camera is encoded by an analog to digital converter of the prior art. The converter produces $k$ binary outputs, corresponding to $k$ binary digits (bits). The output in some cases is in Gray Code and in other cases is natural binary code but the code is not necessarily related to counting in the scale of two; in general, any code is suitable wherein each bit position has a specific weight associated therewith, or even in some cases a code which can be translated to a weighted code. Gray Code may be considered from either viewpoint: translated to a weighted code; or as stated in his Patent No. 2,632,058, column 8, line 65, to column 9, line 11 (with minor typographical errors) considered to have weights peculiar to each bit position although the algebraic sign may depend on other bits.

Further, in accordance with the invention, each of the $k$ code bits is (according to its position or significance) considered individually until the picture is reconstructed in the television receiver, so that bits assigned different weights may be transmitted at different average signalling rates.

It may be imagined that a still picture is dissected (by the analog to digital converter) in the brightness dimension only, to provide individual component pictures, herein called bit maps, each of which corresponds to a specific positive-weighted code bit and records the bit value at each picture point; when a moving picture is encoded the bit maps change as a function of time. To understand the broad aspects of the invention, we may now hypothesize $k$ motion-picture projectors each projecting the film recording of a specific moving bit map, the maps being in exact registry on the screen and exactly synchronized. Each film recording will consist merely of clear and very opaque areas, but the illumination of each projector will be adjusted to provide, in clear areas, screen brightness in proportion tothe bit weight; whereby, in view of the weighted code, the original picture will be reconstructed.

Suppose, now, that the projectors are turned on only one at a time: Viewing a low-weight bit map projected with low brightness, a person will not be able to perceive as much detail as when viewing a high-weight map, projected more brightly. He will likewise be less sensitive to rapid motion or flicker in the weaker map. It is seen, therefore, that it is wasteful to provide the same high spatial and temporal resolution for low-weight bits as for high-weight bits. The present invention therefore discards subjectively imperceptible or unimportant information, by reducing spatial and/or temporal resolutions for bit maps associated with relatively low-weighted code bits, thereby making more economical use of the binary transmission channel in relation to a transmitted picture.

In the first general embodiment of this invention, illustrated by FIGS. 1 and 2, a picture is converted into an electrical video signal by a prior art television camera, the video signal is digitized and binary digits resulting from the analog to digital conversion are stored on separate bit maps, one bit map for each digit of the number. Copies of these bit maps are subsequently stored in the receiver and there recombined to provide the picture. It is the essential feature of this invention that, although at least one of the bit maps may be reproduced at the receiver with essentially the full spatial resolution and detail provided by the television camera, other bit maps are deliberately made "unsharp" in order that they may be transmitted with less channel capacity.

Thus, whereas a conventional analog television picture for example, may be transmited with a certain fidelity over a channel having 4 mc. bandwidth, the same picture transmitted with the same fidelity by sending a 7-bit binary number for each brightness point would require at least 28 mc./sec.; an intermediate bandwidth suffices for this invention, the exact relationship depending upon the degree to which the various bit maps are made "unsharp." It will be noted that high-frequency spatial details are still transmitted, although only for certain (generally most significant) digits, and delicate variations of brightness are also sent, albeit without concurrent high spatial resolution. The picture is therefore not as faithful in reproduction as either the analog picture or the pictures with which it is compared above, transmitted with full resolution on each bit map, but the type of degradation is such as to be subjectively acceptable or even imperceptible, despite transmission of considerably less data than required for so-called PCM transmission.

It is characteristic of this general embodiment that the most satisfactory results will ordinarily be obtained when the stored bit maps correspond to a unit-distance numbering code (such as the reflected binary code, also known as the Gray Code), the conventional (or "natural") binary code being a particularly bad choice. To understand one reason for this, we may note that many bit map outlines do not correspond to picture edges, characterized by large step changes in the picture brightness, but correspond instead to gradual picture shading, for which the digital representation changes only one brightness unit at a time. Furthermore, it is the nature of the natural binary code that whenever two numbers which differ by only one unit in value are represented by opposite bit values (0 for one and 1 for the other) in a certain digit place, all digits of lesser significance likewise change. Thus, 0010111 (23) and 0011000 (24) are successive natural numbers, and all four right hand digits change therebetween. It follows therefore that any pattern boundary appearing on the $j^{th}$ natural bit map because of picture shading is repeated on all subsequent (lesser weight) natural bit maps. When the transmitted bit maps are recombined in the receiver, the shading will not be reproduced properly unless all these boundaries are in exact register and are equally sharp. Reduced sharpness in some of the component boundaries are edges when the invention is used would produce artificial lines along equal-brightness contours. The causative process is somewhat similar to the "unsharp masking" sometimes deliberately employed by photographers. The photographer's process accents only picture outlines to produce an effect acceptable and pleasing to the eye, but in the case of the invention, such lines superimposed on the interior of gradually shaded areas would be seen as objectionable artifacts. For this reason, the first embodiment, of FIG. 1, shows the use of the kind of analog to digital converter which produces Gray Code bit maps and a Gray Code picture representation is transmitted to the corresponding receiver. Gray Code, being a unit-distance code, is characterized by no more than one digit change between successive number values. Artificial contour lines are thereby avoided inside shaded areas, even when some bit maps are unsharp. Where true picture outlines are accentuated the result is not displeasing.

Bit map storage and/or Gray Code video representation are not essential to the invention; two further embodiments of FIGS. 3 to 6 require neither of these features for best operation, and further illustrate the scope of the invention.

Both of these latter embodiments are distinguished by the fact that transmitted binary pulses correspond to presence or absence of equal dots of light when the picture is reproduced in a receiver having sufficiently high bandwidth. The number of such elementary dots in any picture area determines the average brightness of said area; the average brightness of a large area is therefore reproduced with more precision than a smaller area. Although individual bit maps are not stored in such form at either transmitter or receiver, it may be considered that all bit maps are sent by time-division multiplex. The bit maps here correspond to natural binary code, and the number of dots per second employed to sample and reproduce each bit map is made proportional to the bit weight. High-weight bit maps are therefore reproduced with more detail than lower-weight maps. In the system of FIGS. 3, 4 and 6, dots are separable as interleaved regular matrices, each bit may being transmitted on a particular matrix, but in the preferred embodiment of FIGS. 5 and 6, dots and bit maps are related in a random manner.

It is not expected that the latter embodiments, employing binary dot interlace, can equal the general embodiment of FIGS. 1 and 2 for providing the best picture quality in relation to the channel capacity utilized. The system of FIGS. 1 and 2 has the further advantage of providing easy interconversion between different scanning standards. Furthermore, it lends itself to the incorporation of additional prior art techniques for further channel economy, including frame-rate reduction in the transmitted signal and statistical coding (e.g., run-length coding) of the signal. Nevertheless, the dot interlace form of the invention is believed to be important for specific applications because of the simplicity of the required equipment and because it can be used to broadcast a binary signal essentially compatible with existing television receivers.

Some of the objects of this invention are:

To transmit television pictures by means of digital signals providing a higher-quality picture than has heretofore been possible in relation to the signalling rate;

To encode and decode television signals by convenient means such that less channel capacity may be used than heretofore required;

To remove from a television signal information components which contribute relatively little to subjective quality;

To achieve the above objects with a binary digital television signal which may conveniently be statistically recoded on the transmission channel for still further economy; and To provide a binary-coded television signal having the advantages of such coding but also capable of reception on a conventional television broadcast receiver.

Other objects and advantages will be apparent from the following description and accompanying drawings, in which.

For simplicity in reducing the need for legends the drawings use various logic symbols generally corresponding to those of MIL-STD-806A such as:

(a) the "D" shield for AND gate,
(b) shield with one concave and two convex sides for OR gate,
(c) rounded end narrow rectangle for delay,
(d) small circle (or half circle) for NOT or inverter circuit, and
(e) mere rectangle suggesting the two "sides" of a flip-flop or other "binary";

however such sides are emphasized by a dotted divider line with:

(a) complement or count input at such divider line,
(b) an X to replace a non-essential input to either side (as in monostable or astable circuits),
(c) a common input direct to one side and through a NOT to the other side to designate Schmitt trigger operation.

Figure 1:
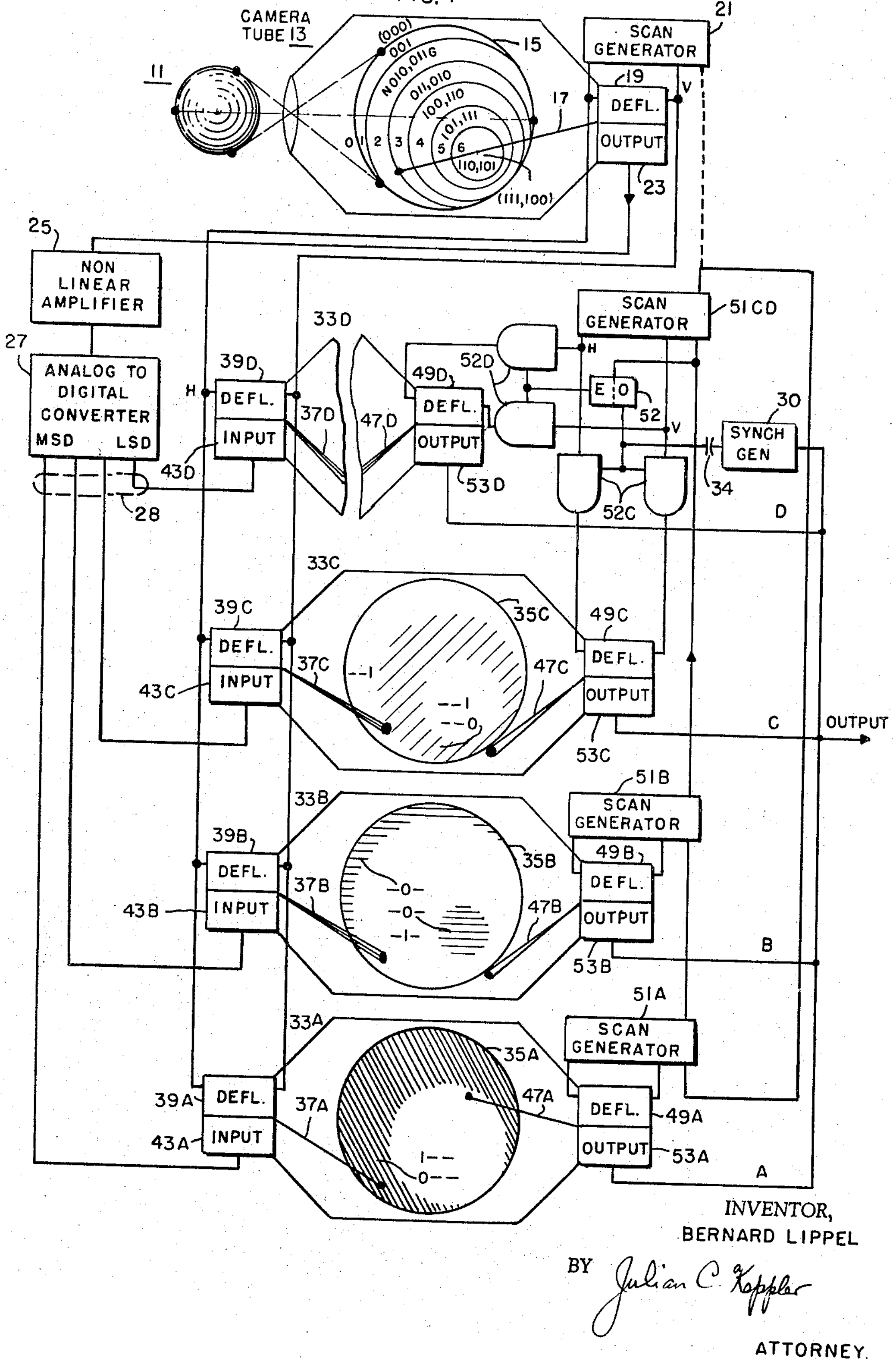
FIG. 1 represents the invention in a general form as applied to a transmitter, including illustrative patterns or bit maps in reflected binary code, a unit-distance code commonly called Gray Code.
Figure 3:
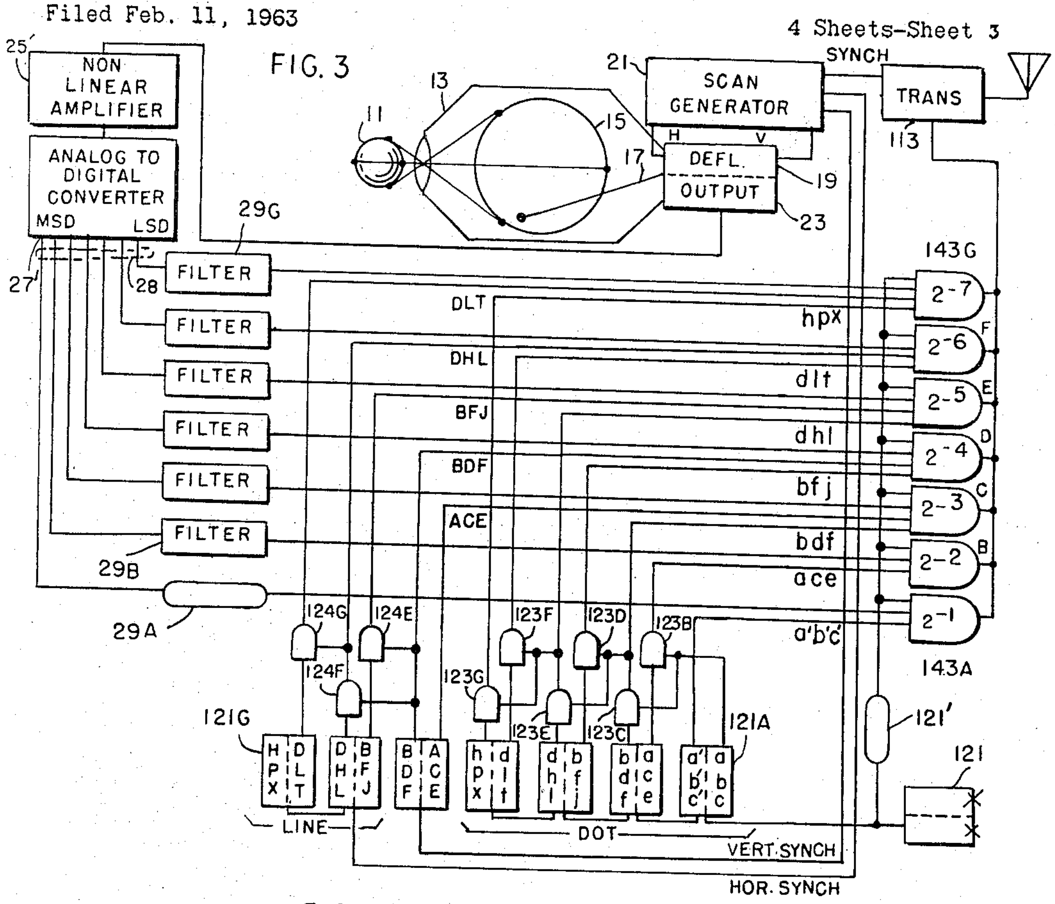
FIG. 3 represents a different and much simpler embodiment of the transmitter, which also permits a greatly simplified receiver as shown in FIG. 6.
Figure 5:
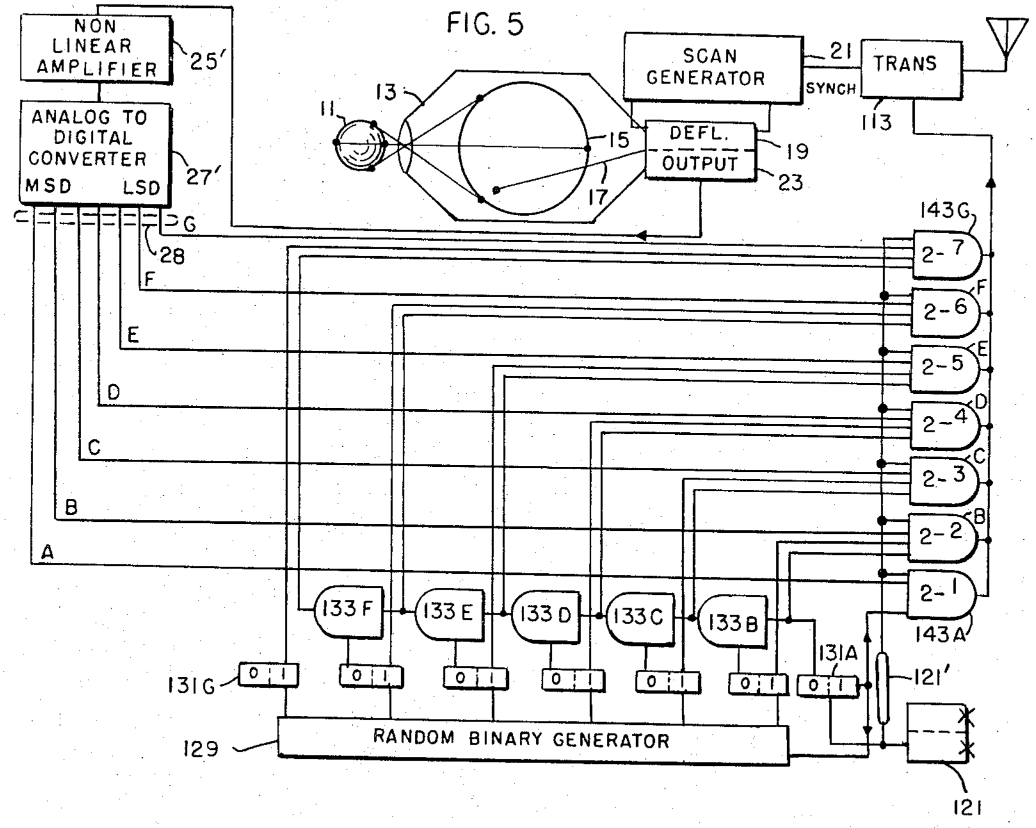
FIG. 5 represents a further improvement and simplification of the transmitter of FIG. 3.

In FIG. 1 an object 11, shown as a sphere, is in the field of a TV camera tube 13 and produces an inverted image 15 therein to be scanned. For simplicity a quantized range from 1 to 6 brightness units has been assumed for the brightness zones defined on the image by the several zone outline circles; brightness 0 (beyond the edges) and 7 (not provided by the assumed illumination) may also be considered for analysis, a total of eight levels. These eight levels are sufficient for a general understanding of the binary code aspects of the operation. In order to bring out other aspects, the system shown in FIG. 1 provides for sixteen levels and practical systems might use thirty-two, sixty-four, or one hundred twenty-eight levels as indicated in FIGS. 3 and 5. The circuit diagrams are particularly the pictorial representations such as bit maps would for more levels require more detail without a comparable gain in understanding of the invention. The intensities of brightness zones of the sphere are indicated by numerals 0 to 6 and also marked in binary notation, both natural code (N) and Gray Code (G). For the 0 and 1 levels these would be alike; the other are shown by double binary numbers, separated by commas.

Included within the camera, and normally considered part thereof, are the camera tube 13 with scanning beam 17, output unit 23, deflection unit 19, and the scan generator 21 which controls the deflection. The amplifier 25 would also normally be included in the camera. The output unit 23 normally would be closely associated with the surface on which the image 15 is stored, but is diagrammatically represented adjacent to the deflection unit 19, since both are related to the one scanning beam 17. This representation corresponds to that used for the dual beam storage tubes or scan converters 33A, B, C, D, noted below, where it is even more effective in avoiding confusion between the write inputs and read outputs.

As the beam 17 scans the image on the camera tube 13, a video signal is generated at the camera output 23 which, after amplification, is digitized in the analog to digital converter 27. In order to take advantage of the somewhat logarithmic subjective effect in the eye, such the larger quantum steps are tolerated at higher brightness values, the amplifier 25 may be made non-linear. The analog to digital converter 27 provides a Gray Code representation of the output of amplifier 25 on the parallel output leads 28. Each lead provides one binary digit of the Gray Code, the most significant bit (MSD) being furnished to input unit 43A of scan converter 33A, the next most significant being applied to scan converter 33B, and so on. Inasmuch as only four bits are shown in the diagram, the least significant bit (LSD) is furnished to the input 43D of scan converter 33D. The analog to digital converter 27 should be one capable of encoding the highest frequency components contained in the amplifier output. One suitable converter is a parrallel-output cathode-ray coding tube with Gray Code mask, for example, that described by R. L. Carbrey in "Proceedings of the Institute of Radio Engineers, vol. 48, No. 9, pages 1546–61 and FIGS. 3 and 5. Another suitable technique would be that disclosed by Jack Breckman in U.S. Patent 2,733,432.

Deflection means 19 of the camera and input deflection means 39A, B, C, D, of the four scan converters are connected in parallel to the same scan generator 21, so that the camera beam 17 and the converter input beams 37A, B, C, D, are all at corresponding points of their storage surfaces 35A, B, C (D not shown) at the same time. Each of the storage surfaces therefore receives a particular bit map A, B, C, D, such that their combination represents the image 15 in the camera by means of the Gray Code, and when the camera image moves, the bit maps are correspondingly altered on successive frames of the scan generator 21. One reason for storing maps in the Gray Code form has already been explained.

The remaining portions of FIG. 1 have been drawn to explain this form of the invention by means of a very simple example. The figure shows on the three storage surfaces 35A, B, C, the Gray Code bit maps corresponding to the image 15 shown within the camera tube. This can be ascertained by inspection of the 3-bit Gray numbers shown to the right of the commas on the image 15. Thus, inasmuch as the right hand bit is 0 within a band comprised of brightness zones 3 and 4, and is 1 for the remaining zones, the image on storage surface 35C has been shaded to show the "0" band, and left white to show the "1" band, corresponding to brightness zones 1, 2, 5 and 6; the other two maps have been drawn likewise in relation to the bit values. The intensity of shading is merely to symbolize different significance of each bit map, equal electrical signals being actually stored. The bit map for scan converter 33D is not shown, since it would correspond to a fourth bit, requiring a larger number of circles on the image 15, which would be too confusing for purpose of illustration.

The deflection and output circuits of the four scan converters are arranged to transmit each separate bit map by use of an appropriate channel, illustrated by a common output, using half the total channel capacity for map A, one-fourth for map B, and one-eighth each for maps C and D. This is accomplished by providing the greatest spatial resolution, (for example, 525 lines) as well as the highest frame rate for map A; by reducing both horizontal and vertical resolution by a factor of approximately the square root of two (e.g., to 370 lines) for the B, C, and D bit maps, and by further halving the frame rates for C and D.

For accomplishing this purpose, the scan generator 51A provides a scanning raster such that map A is scanned with the assumed 525 lines resolution in an assumed time interval of twenty milliseconds, after which a signal is sent to scan generator 51B to initiate its sweep of the map B. This scan generator (and also the subsequent scan generator 51CD) sweeps out a 370-lines raster in ten milliseconds. If the output channel is limited to a bandwidth corresponding to 525 lines horizontal resolution for map A, then the horizontal resolution of Map B will be approximately 370 lines. This is because the product of horizontal and vertical resolutions (or the square of either one if equal), divided by the actual time of scan is a constant for a fixed bandwidth system.

When the scan generator 51B has completed its raster, a signal is sent to both generator 51CD and the odd-even counting flip-flop 52. If the counter happens to be in the "even" state, it quickly changes to the "odd" state. The pulse communicated through the coupling capacitor 34 to the synch generator 30 is then of the proper polarity to initiate the generation of a synch pulse. It may be assumed that the counter state has been altered and the synch pulse generated while the scan generator 51CD has been starting up, and before a map output signal has been generated. Since the counter has now become "odd," the pair of gates 52C are enabled so that horizontal and vertical scan signals are applied to deflection unit 49C. The two gates 52D which are likewise connected to the "even" counter output are meanwhile disabled so no signals appear at this time at deflection unit 49D. Consequently, map C is scanned with 370-lines resolution during the next 10 milliseconds.

When scan generator 51CD concludes its scan it, in its turn, triggers scan generator 51A to repeat the cycle. On the second cycle, however, the counter 52 changes from "odd" to "even." The pulse received by the synch generator 30 is now of the wrong polarity for production of an output, so the synch pulse is omitted. Furthermore, the scan generator is now connected through the gates 52D to the deflection means 49D and map D is read out in place of map C. It will be seen that map C is read on all subsequent odd-numbered cycles, D on the even-numbered cycles, and synch pulses are produced on odd cycles only. The cycle time is 20+10+10=40 milliseconds, corresponding to 25 frames per second for maps A and B and 12.5 frames per second each for C and D. It is essentially immaterial whether this cycle time is synchronized with the camera frame rate; a mere dotted line connection has therefore been drawn between the scan generator 51D and the camera scan generator 21.

It will be seen that the four readout signals from the four bit maps, as well as the short synchronizing signal which precedes map C, appear one at a time at the combined output, and are therefore suitable for transmission over a single wire or radio channel of appropriate bandwidth. In FIG. 1, it is assumed that beam 47A is in use while beams 47B, C, and D are awaiting their turns later. The bit maps are inverted corresponding to the optical inversion in the camera. Therefore, scan commences in the lower right corner, following the usual convention.

The combined transmitter output signal appearing at the extreme right will be seen to be, with the possible exception of the synch signal, a 2-valued signal alternating between two fixed amplitudes (i.e., a binary signal). As in prior systems of binary digital televison, the synch signal may be made recognizable by providing an excursion to a third and different amplitude, and/or by means of a distinctive waveshape pattern. The constant recurrence frequency of a synch signal may also assist in its recognition.

Figure 2:
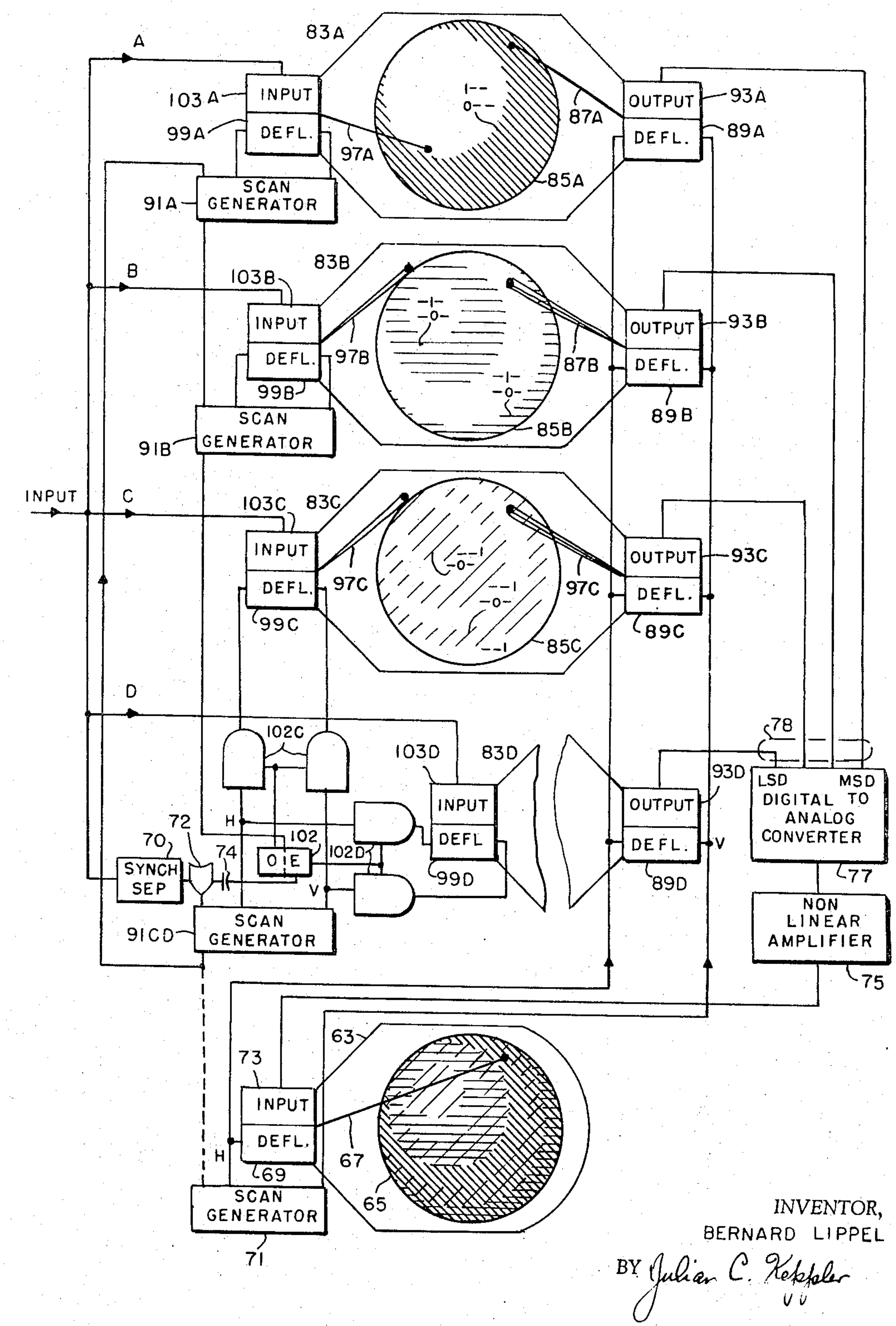
FIG. 2 represents a corresponding receiver except that the bit maps are illustrated for nautral binary code.

The receiver of FIG. 2 is substantally merely the complement of FIG. 1. A synch separator 70 (well known in the prior art) produces an output only during each occurrence of the transmitted synch signal. The receiving scan generators 91A, B, and CD and the odd-even counter 102 are arranged to cycle in a manner similar to the transmitter output scanning generators, and the synch signal locks the phase of the receiver cycle to that of the transmitter cycle as further described below, thus assuring proper sorting out of bit maps onto the receiver scan converters 83A, B, C, D.

Recalling that a synch pulse is transmitted just before each C map, upon receipt of the first synch pulse, a triggering pulse from the synch separator 70 will pass the OR gate 72 and trigger scan generator 91CD. Assuming that the odd-even counter 102 is in the odd state at the moment, the subsequent bit map C will be written onto the storage surface 85C. Scan generator 91CD, upon completion of its raster, triggers 91A, and 91A triggers 91B, as in the transmitter, and the bit maps A and B are recorded on their proper surfaces. Generator 91B then triggers the counter 102, causing it to change from "odd" to "even." Scan generator 91B is connected to 91CD only through the OR gate 72, the coupling capacitor 74, and the counter 102, and is arranged to actuate it at odd-to-even transitions of the counter. The scan generator 91CD therefore responds to the signal from 91B. It will be seen that, so long as the transmission is not interrupted, the receiving scan generator chain, and the odd-even multiplexing of maps C and D remain in phase with the transmitter, scan generator 91CD being triggered alternately by transmitted synch pulses and counter output transitions.

Of course, when the counter 102 happens to be "even" at the moment of starting, the chain of scan generators is not locked in proper phase at the time of receipt of the first synch pulse; therefore bit map C is (improperly) written onto the storage surface of scan converter 83D, and responding to the next count signal from scan generator 91B the transition of counter 102 is of the wrong polarity to actuate scan generator 91CD thru OR gate 72. Furthermore, the transmitter is now about to send map D, therefore no synch trigger signal appears at the other input of OR gate 72. The scan generators therefore remain quiescent for one whole transmitter cycle, until a second synch signal is received. This time, however, the counter is "odd' and may C is properly recorded. Furthermore, when generator 91B completes its next scan, it changes counter 102 from "odd" to "even" and the transition pulse provided to the OR gate 72 is of the proper polarity to trigger scan generator 91CD. The counter being now "even," map D is recorded on its proper converter 83D, and the receiver remains thereafter in phase with the transmitter.

The signals from the transmitter output units 53A, B, C, D, meanwhile appear one a a time on the input units 103A, B, C, D of the receiver scan converters, exactly as required so that the set of moving or time-variant bit maps, generated by the analog to digital converter 27 of the transmitter and written into the transmitter scan converters, are also reproduced on the surfaces 85A, B, C, D of the receiver scan converters (except that specific maps may have been reduced in spatial and/or temporal resolution).

Even though the maps on the receiver scan-converter surfaces 85A, B, C, D are actually Gray Code maps (each similar to the corresponding map on surfaces 35A, B, C, D of the transmitter), the maps in FIG. 2 have been drawn as if converted to the natural code equivalents, better to suggest the effect obtained by combining the several maps. The natural code is more convenient for such illustration, requiring only that the maps, each with appropriate density, be imagined superposed one on another while the Gray Code calls for combination of sometimes positive and sometimes negative increments, in a fashion much less easily visualized from the drawing. The maps of FIG. 2 are upright, as required for display corresponding to the original object 11, and are therefore inverted with respect to those of FIG. 1

No attempt has been made to indicate on the bit map patterns of the drawings the effect of different spatial resolutions although certain scanning beams are broadened to suggest this effect. The effect of reducing spatial resolution in Gray Code maps B, C, and D relative to A, is equivalent in the natural code representations of FIG. 2 to provide a sharper boundary between brightness zones 3 and 4, (present only on Gray Code map A, but found on all three natural code maps) than for any of the remaining bit-map boundaries (derived from B or C Gray Code maps). It may further be ascertained, by examination of the equivalent map representations on FIGS. 1 and 2, that the Gray Code maps are much more economical of detail, inasmuch as each Gray Code boundary due to shaping occurs not only on the corresponding natural map, but also on all lower-order natural code maps. This simplifying property of Gray Code is particularly advantageous when the binary signal sent from transmitter to receiver is recoded (using run-length, outlines transmission, or some other exact coding process) to further economize on channel capacity.

Returning now to FIG. 2 (but recalling that Gray Code patterns are actually stored) scan generator 71 provides a scanning raster for the picture tube 63 (preferably with conventional 60 fields and 2 to 1 interlace) and, simultaneously for readout of each of the scan converters 83A, B, C, D. For the present example the scanning resolution is preferably 525 lines. The deflection unit 69 of the picture tube is connected in parallel with the scan converter output deflection units 89A, B, C, D. The four readout beams 97A, B, C, D consequently cooperate to simultaneously explore corresponding parts of their respective bit maps, and they furnish 4-bit binary numbers (shown on parallel leads 78) to the Gray Code-to-voltage converter 77. The analog voltage from this converter is the video signal transmitted to the picture tube 63 through the amplifier 75.

The analog voltage transmitted to the picture tube is the substantial equivalent of the camera output 23 in the transmitter, and in accordance with the principal feature of the invention it would, in the example, have the approximate subjective quality of a 525-lines picture encoded and transmitted with four binary digits. In contrast with most prior art whereby direct transmission of the binary-coded video would require a bandwidth of about 13.3 megacycles per second (for 4 bits and 25 frames per second), only about 6.7 megacycles/per second would be needed for the system of the example, and if the example had been drawn to show the larger number of bits generally accepted as necessary for brightness representation, the saving would appear to be even more marked.

The digital to analog converter 77 is shown receiving a parallel Gray Code input 78. The device used should respond faithfully to the highest frequency signals found on any of its input leads, to avoid reducing the picture resolution. Parallel Gray-to-voltage decoding is discussed by F. A. Foss, in I.R.E. Transactions on Electronic Computers, vol. EC–3, pp. 1–6 (December 1954), and is usually effected by cascading a parallel Gray-to-natural translator and a parallel decoder for natural binary code. Carbrey describes (on pp. 1556–58 of his referenced article) one such combination having speed and accuracy adequate for most applications using the present invention. Gray describes a direct serial decoder for his code, shown in FIG. 5 of his Patent No. 2,632,058. For serial input the method including a special serial translator and subsequent serial decoders which is described in applicant's prior Patent No. 2,711,499 (specifically FIG. 1) would be particularly helpful. Serial input for the converter 77 would be obtained by sampling the bit-maps in very rapid rotation. Serial translators and decoders, altho economical of parts, require very fast circuits.

The amplifier 75 will ordinarily have a non-linear transmission characteristic which, if made exactly inverse to that of transmitter amplifier 27, would provide an overall linear transmission, except for quantum steps of graduated size. Departures from an inverse relationship may be utilized to provide the usual gamma, contrast and level controls.

Referring now to transmitting scan converters 33A, B, C, D and receiving converters 83A, B, C, D these may be similar to the scan converters used, particularly in Europe, to transfer television programs between systems having different scanning standards. A discussion of such devices will be found in an article by A. B. Lord in Electronics, vol. 26, pp. 144–147 (August 1953) entitled, "Standard Converter for International TV." Certain converter tubes designed for radar scan conversion may also be used. The device discussed by Lord and now widely used is essentially a picture tube operated in one system viewed by a camera operated in the second system. Problems discussed by Lord including direct pick-up of the writing beam, line beating and frame beating (such as would occur between European systems employing 50 fields per second and American systems employing 60 fields per second), are greatly minimized for this invention, inasmuch as only two values of image brightness are recorded for each bit map, permitting moderate amplitude variations due to such effects to be eliminated by restoring the output to standard binary signal amplitudes.

As already noted briefly, the synchronizing connection between the camera and write-in scan generator 21 and the read-out scan generators 51A, B, CD, has been shown dotted; the same applies to the connection between write-in scan generators 91A, B, CD, of the receiver and their associated read-out and picture tube scan generator 71. If desired, one or both of these connections may be omitted since the only essential transmitted synchronization is between transmitter scan generators 39A, B, CD, and receiver scan generators 91A, B, CD. This is particularly advantageous not only when it is desirable to operate the camera with different scanning standards than are to be used on the picture tube, but also to utilize an effect known to prior art whereby the frame rate for transmission of the picture may be less than would be suitable for display in the picture tube, provided that the receiver scanning generator 71 produces a frame or field frequency sufficiently high to prevent subjectively appreciable flicker. Such frame rate reduction is very conveniently utilized in this form of the invention, as are other prior art techniques of which examples are to be described below. Thus returning to the example of FIGS. 1 and 2, although the frame rate for maps A and B has been illustrated as 25 frame per second (a particular rate employed mainly to emphasize independence of the 30 frames/sec. rate of the assumed conventional camera and picture-tube display), a somewhat lesser frame rate would ordinarily be sufficient; however at least the picture tube 63 should meanwhile be scanned with the usual 30 frames and 60 fields per second, or a comparable field rate.

The foregoing general embodiment of the invention is particularly effective because of the great flexibility it affords for adjusting all resolutions to give an optimum effect. FIGS. 1 and 2 are intended as merely illustrative; in either transmitter or receiver the overall effect would be the same with continuously running scan generators and intermittent time multiplex switches for the information transmitted from one set of scan converters to the other, the same synch signals relating to timing of both scan generators and switches. Other techniques, such as frequency multiplex, would permit complete freedom in selecting the proportion of the total channel capacity used for each bit map. The techniques for varying resolution in a stored image by suitable control of the read-in and read-out scanning are well known to the prior art and the time-sharing of one communications channel between several scan converters is considered obvious. Therefore, we have shown a very elementary example of all such systems, involving both spatial and temporal variation of resolution by means of four scan converters. Where five, six or more bit maps, requiring a like number of scan converters, may actually be used in constructing the invention, various manners of accommodating the increased number of digits will be abundantly clear to those skilled in the art, including systems transmitting increasingly unsharp bit maps all at the same frame rate. Reduction of only spatial resolutions is much more effective than the converse reduction of only frame rates suggested in the prior art, at least for least-significant digits as an alternative to their omission (Schreiber, U.S. Patent 2,941,040, column 2, lines 58–61). For example, reducing the number of scanning lines for successive bit maps in ratio of the square-root of two would be preferable to scanning with fixed number of lines but successively halving frame rates.

It will also be appreciated that the scan converters 33A, B, C, D and 83A, B, C, D are typical of a large class of storage devices suitable for the receiver and transmitter of this form of the invention. The embodiment can be made with any storage device which will enable vertical and horizontal reduction of bit-map spatial resolutions, altho scan converters and related random access devices also lend themselves to flexible variation of temporal resolution or frame rate and time-multiplexing of maps.

Persons skilled in the art will also recognize that another system of scanning rasters than that shown in FIGS. 1 and 2 will usually be preferred. For example, instead of frame-by-frame multiplexing, bit maps might be multiplexed on a line-by-line basis thereby minimizing moving image breakup, with line-interlace of bit maps to reduce stroboscopic effects; this would be particularly important when a minimum frame rate is transmitted. It may also be advisable in some cases for the bit maps to be scanned in various directions, not necessarily horizontal or otherwise the same as in the camera and picture tube.

Whenever a scan converter such as those of FIGS. 1 and 2 is operated to read out an image with less resolution than the input video would permit, it is desirable that the scanning apertures for writing, reading, or preferably both, be made of a size commensurate with the lesser resolution. This is illustrated in the drawings by broadening of the B, C and D beams. As discussed in the referenced article by Lord, an effective and convenient way to adjust the scanning aperture for low resolution is with spot wobble.

The arrangement of the example, whereby each bit map (except a last) requires half the channel capacity of a previous bit map, a total of only twice the analog bandwidth, applies regardless of the number of bits, and when a larger number of bits is used (such as seven or eight) much better pictures will be obtained than with a conventional PCM system using equivalent bandwidth (i.e., a system providing equal resolution in all bit maps). For example, suppose the analog to digital converter furnishes eight bit maps of which at least the most significant are transmitted at the orignal 30/sec. frame rate: then, using an 8-bit version of the system described, a picture approximating a 525-lines conventional picture would need an 8 mc./sec. channel; but, to send 8 bits over the same 8 mc./sec. channel by prior art PCM television, it would be necessary to reduce horizontal and vertical resolutions equally to about 260 lines, corresponding to 1 mc./sec. analog video, and the decrease in quality would be very noticeable.

The principles of the invention may also be applied more conservatively, utilizing, for example, three times as much bandwidth for all bit maps collectively as for the best-definition map alone. This may be done by assigning the channel capacities according to various plans resembling the foregoing regular progression which uses a uniform factor of one half, for example:

(a) Successively applying a factor of *two-thirds* in geometric progression for the more significant bit maps. For example, using seven bits, the channel capacities may be in the ratios of 1, $\frac{2}{3}$, $\frac{4}{9}$, $\frac{8}{27}$, for the first four maps and $\frac{16}{81}$ for the last three. The sum of the ratios, $(81+54+36+24+3\times16)/81$, is exactly three;

(b) Using equal capacities for the *two* most significant bits, then successively halving the others as before; or (c) Using the same capacity as before for the most significant bit, but equal capasities for successive *pairs*, halving after each *pair* of bits insteads of each bit.

In many instances the most important picture information is not in the first (most significant) bit map, in which case other maps may be transmitted with higher definition than the first.

Still further economies may be realized by taking advantage of statistical properties of the bit maps to recode the binary output signals before transmission, after which a complementary decoding device provides the actual input to the receiver of FIG. 2. A well-known such technique is run-length coding. The example thereof shown in Schreiber Patent No. 2,941,040 is particularly helpful, inasmuch as it shows the coding of one representative analog to digital converter output, corresponding to one bit map of the present invention. Gray Code, by reducing the number of bit map areas, would improve the effectiveness of run-length coding, as would the "unsharpening" of the less significant bit maps.

Another suitable recoding process would be one that transmits signals indicating only the outlines of bit-map areas. A standard picture margin could always correspond to the bit-value "0," and the value of any other area would then be determinable according to whether an odd or even number of outlines separated it from the standard margin; i.e., when separated from the standard margin by an odd number of outlines, an area would be "1"; when separated by an even number, it would be "0." The same method for determination of the binary value of a bit map area could be adapted to run-length coding.

Figure 6:
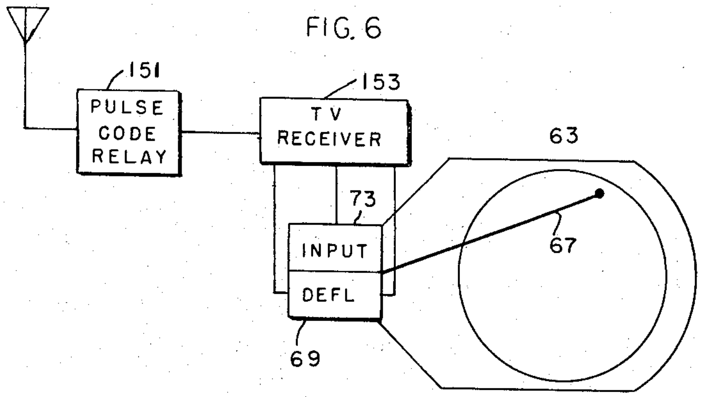
FIG. 6 represents the substantially conventional and very simple receiver which may be used with the transmitter of FIG. 3 or 5.

For many purposes, it is preferable to employ the related further embodiments of the invention illustrated by the transmitter of FIGS. 3 and 5, either of which may cooperate with the substantially conventional receiver of FIG. 6. Either of these transmitters operates directly upon the natural binary code output from an analog to digital converter 27', samples the 2-valued code signals appearing on leads 28A through 28G, and transmits the samples in time-multiplex fashion. If the binary code signals were sampled in rotation, with the same sampling rate for each digit, the result would simply be serial transmission of binary-coded video or PCM, very well known in the prior art. In accordance with the present invention, however, the various digit outputs are indeed sampled one-at-a-time, but the rate and/or manner of sampling of each bit signal on the converter output leads 28A through 28G is generally different for each lead. With this class of embodiments, storage devices (illustrated by the scan converters of FIG. 1) are unnecessary.

The binary coded signal sent out by the transmitter of FIG. 3 may be decoded by means of a receiver including a complementary de-sampler synchronized with the transmitter, and a digital to anolog converter. Such a system would be somewhat analogous to the receivers of prior art PCM systems, modified for the generally different sampling rate for each code digit. As will be shown for the systems of FIGS. 3 and 5, the manner of sampling may, with the present invention, also be chosen such that the transmitter is also essentially compatible with a conventional television receiver, 153 of FIG. 6, the received sequence of bit samples merely modulating the picture tube beam as if it were an analog signal. Such compatibility is not possible with the seriol PCM systems of prior art.

Referring now to FIG. 3, the object 11, image 15, camera 13, deflection means 19, output means 23 and scan generator 21 correspond to like-numbered elements of FIG. 1. The camera scanning, video and synchronization circuits may also correspond to commercial practices and standards, henceforth assumed to include 525 lines, two-to-one interlace, and thirty frames (sixty fields) per second. For convenience, only the video signal from the output 23, without added synchronization signal, is sent to the amplifier 25', but such separation is not absolutely essential to the invention. The amplifier 25' may have a non-linear transmission characteristic adjusted for the most pleasing overall effect, an adjustment not necessarily the same as that of amplifier 25 in FIG. 2; but this will be discussed more fully below.

In order that a conventional receiver 153 of FIG. 6 may serve for reception, the analog to digital converter 27′ provides output in natural binary code, preferably on parallel leads. A suitable arrangement would be the Gray coding tube described by Carbrey and referenced above, followed by the Gray-to-natural translator described in the same article. A simpler arrangement would utilize either of the parallel-output natural-code cathode-ray coding tubes shown in FIG. 11 or 3 of applicant's Patent No. 3,015,814. The Model AD–50A converter manufactured by Raytheon Company would also be suitable and exemplifies the use of a successive comparison technique.

The delay unit 29A and the filters 29B through G may be ignored for the moment and will be discussed later.

In view of the natural code output of the converter 27′, it is convenient to identify particular binary digits (bits) on the several leads 28A through 28G as well as their associated bit maps by the weight assigned to each. Assigning to the video signal from amplifier 25′ normalized amplitude values ranging substantially from zero to unity, the first bit (and bit map), on lead 28A, will be assigned weight ½; the next bit, on lead 28B, will be assigned weight ¼; the next ⅛; and so on. The sampling circuits of FIG. 3 are arranged to provide a different matrix of dots for each bit map, including those shown on the extreme right of FIG. 4.

Figure 4:
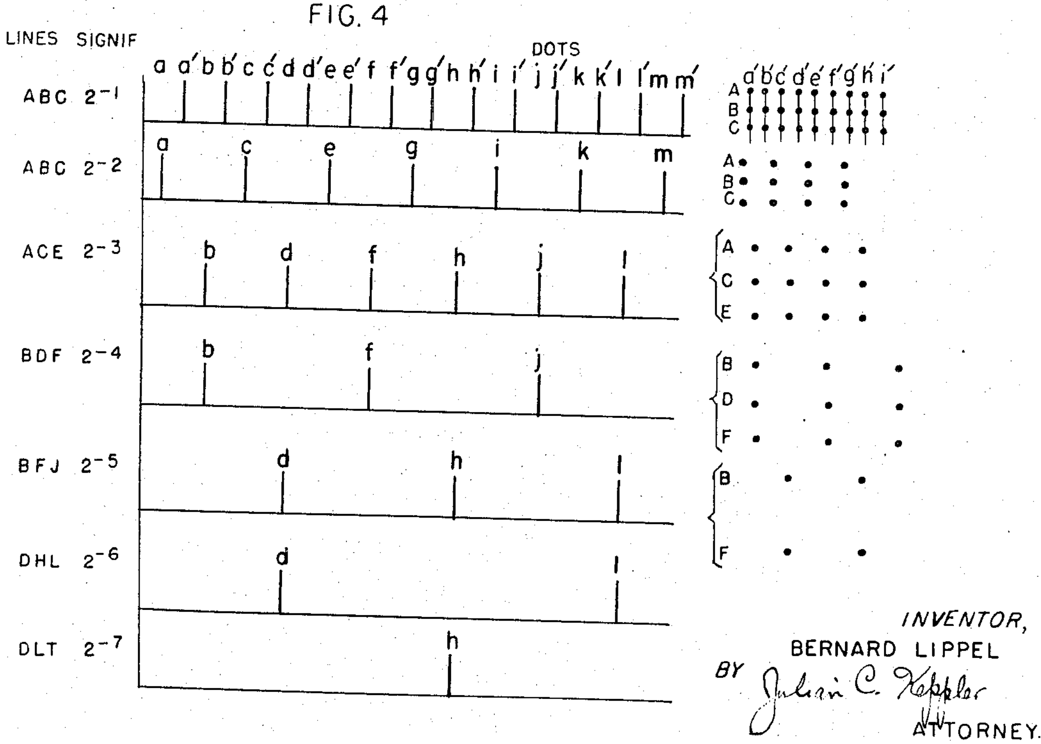
FIG. 4 represents a typical timing pattern involved in the operation of FIG. 3.

A constant-frequency clock-pulse generator 121, illustrated merely as an astable binary circuit, which puts out approximately 16 million pulses per second, is connected to the binary counter stage 121A and through a small delay unit 121′ to the output gates 143A to G. The delayed pulses are represented at the top of FIG. 4 by the lowercase alternately primed and unprimed letters *a*, *a′*, *b*, *b′*, *c*, *c′*, etc. and will henceforth be referred to as the clock pulses. The delay unit 121′ assures that all counter stages will have changed state by the time a clock pulse appears. Corresponding to the most significant bit map, having assigned weight $2^{-1}$, the left side of the counter stage 121A is connected to AND gate 143A, which is also connected to the delay unit 121′ and to the output digit lead 28A of the analog to digital converter 27′. It will be seen that so long as the binary digit on lead 28A is "1," a pulse train, comprised of all the primed clock pulses illustrated at the top center of FIG. 4 and having constant repetition rate of approximately 8 million pulses per second, is transmitted through AND gate 143A to the radio transmitter 113. Assuming that the transmitted signal is viewed on a special television receiver scanning in synchronism with the camera 13 and having enough bandwidth and spot resolution to resolve pulses as individual dots of light, the dot matrix shown in the upper right hand corner of FIG. 4 will be displayed. The spacing between rows A, B, C, etc. is the normal line spacing of a 525-line system and the exact frequency of the pulse generator 121 would be adjusted to make the spacing between columns *a′*, *b′*, *c′*, etc. (dot spacing) substantially equal to the line spacing. (It will be apparent that there is one dot of the $2^{-1}$ map for every "resolution element" of an ideal 4 mc./sec. picture.) When the camera 13 scans a scene having non-uniform brightness, the bit signal 28A is alternatively "0" and "1" for varying intervals of time and each "0" signal inhibits the gate 143A; whereby the most significant bit map modulates the $2^{-1}$ dot matrix, by which is meant the suppression of dots in "0" areas of the map, but not in "1" areas.

Counter stages 121A, B, C, and D form a 4-stage binary counter and provide oppositely phased pairs of square wave outputs with successively halved frequency. The right hand output from gate 121A is "1" (enabling) in phase with all unprimed clock pulses and "0" in phase with the primed pulses. AND gate 123B receives such pulses from 121A and also the right hand output from counter stage 121B, the square waves of which are twice as long in duration. The output of the AND gate 123B is therefore "1" in phase with only every-other unprimed clock pulse, designated *a*, *c*, *e*, *g*, etc. on the second line of FIG. 4 and on the control lead to gate 143B of FIG. 3. The control signals from gate 123B are combined in AND gate 143B with the clock pulses and the bit signal on lead 28B to generate the modulated dot matrix with weight $2^{-2}$. A small portion of the unmodulated matrix is shown on the extreme right of the second line of FIG. 4.

The left hand side of counter 121B and the right hand side of counter 121A are combined in AND gate 123C to provide *b*, *d*, *f* enabling signals to the output gate 143C, resulting in the horizontal pattern shown on the third line of FIG. 4. It will be seen that the *b*, *d*, *f*, etc. pulse train lacks precisely those pulses, *a*, *c*, *e*, etc. shown on the second line, as would be expected from the fact that they are controlled by opposite sides of the same counter stage.

The *b*, *d*, *f* control outputs from gate 123C are also combined in gate 123D with the square wave pulses from the right hand side of counter stage 121C, resulting in the *b*, *f*, *j* dot selection shown on the fourth line of FIG. 4; the similar combination in gate 123E of *b*, *d*, *f*, outputs with the left side of counter stage 121C results in the *d*, *h*, *l* dot output shown for the $2^{-5}$ matrix.

In like fashion, the *d*, *h*, *l* output from gate 123E is combined with both right hand and left hand outputs of counter stage 121D, in gates 123F and G respectively, dividing the *d*, *h*, *l* control pulses, into a *d*, *l*, *t*, train for the $2^{-6}$ matrix and the remaining *h*, *p*, *x*, etc. train which goes to output AND gate 143G, for the $2^{-7}$ matrix.

It will be noted that equal dot spacing is provided for the $2^{-2}$ and $2^{-3}$ matrices, for $2^{-4}$ and $2^{-5}$, and for $2^{-6}$ and $2^{-7}$. As diagrammed in FIG. 4, however, each matrix in such a pair is meanwhile given different line spacing, and hence has a different number of dots per unit area. The uppermost matrix includes half the total dot population, the second has ¼, the third ⅛, etc. The system of FIG. 3 is also arranged so that wherever dots in the same column are used for more than one matrix they do not appear on the same line, and matrices can mesh together without dot coincidence.

The $2^{-3}$ matrix includes only alternate scanning lines, designated (with capital letters) A, C, E, etc., and only the intervening lines, designated B, D, F, etc., are used for the $2^{-4}$ and less significant matrices. The required separation of alternate scanning lines is accomplished with the aid of a single-stage binary counter 121E triggered by the vertical synch signals from the camera scan generator 21. It will be recalled that a 2:1 interlace scanning system provides one set of alternate lines (A, C, E, etc.) during the first and all subsequent odd-numbered fields, and the intervening set (B, D, F, etc.) during the even-numbered fields. Therefore, the right hand output from counter 121E is combined in output gate 143C with the *b*, *d*, *f* dot-selection signal from AND gate 123C, the bit-map signal on lead 28C, and the clock signal to generate the modulated $2^{-3}$ dot matrix, and the left hand side of counter 121E is likewise combined with the *b*, *f*, *j*, control signal from gate 123D, etc. The B, D, F field signal is also provided to the gates 124E and F in the output of counter stage 121F, which with stage 121G constitutes a two-stage binary counter.

During those alternate fields in which lines A, C, E, etc. are scanned, the operation of the counter is not material, because the AND gates 124E and F (connected to the left side of stage 121E) and the gate 124G (connected to gate 124F) are disabled. During the intervening fields, when counter stage 121E does not disable gates 124E and F, successive horizontal synch pulses preceding B, D, F, etc. line scans enter counter stage 121G, causing it to change state after every synch pulse, and to enable first gate 124E and then gate 124F alternately. The B, D, F scanning lines are therefore separated into two interleaved groups. Gate 124E passes enabling pulses each having the duration of one scan line and contemporaneous with B, F, J, etc. scan lines. These enabling pulses are combined in AND gate 143E with the *d, h, l* dot enabling signals from gate 123E to generate the $2^{-5}$ dot matrix. Gate 124F likewise passes D, H, L line enabling pulses which are combined in gate 143F with *d, l, t* dot signals for the $2^{-6}$ map. (It will be understood that required clock signals and inputs from the analog to digital converter are also provided as shown on FIG. 3.) The 2-dimensional dot matrix for $2^{-5}$ is shown on the right in FIG. 4, but matrices for $2^{-6}$ and $2^{-7}$ are omitted, inasmuch as their dot densities are too low for convenient showing of a small portion. The $2^{-6}$ matrix has the same line spacing as $2^{-5}$ (every fourth frame scan line), but the dot (horizontal) spacing is doubled, while for $2^{-7}$ the dot spacing is equal to that of $2^{-6}$ but the line spacing is further doubled, to become every eighth line. The dot spacings and positions for all seven dot matrices are illustrated in the main portion of FIG. 4 and the line spacing is specified by means of the letters scheme on the extreme left. Table I below will also be helpful.

To obtain the required selection of line pulses for the $2^{-7}$ dot matrix, the output of AND gate 124F is combined with the square wave output from the right hand side of counter stage 121G. The one-out-of-eight line sequence D, L, T is combined in with the *h, p, x* dot sequence from gate 123G in AND gate 143G to generate the $2^{-7}$ matrix. Gate 124G never produces an output during A, C, E fields, inasmuch as gate 124F is then disabled and does not provide the required input to gate 124G.

As shown diagrammatically in FIG. 3, the pulse signals issuing one at a time from the set of output AND gates 143A–G are combined and enter the radio transmitter 113. An OR gate, omitted to simplify the diagrammatic showing, would ordinarily be used for combining the AND gate outputs. The sampling arrangement of FIG. 3 insures that only one output gate 143 at a time passes a clock pulse.

It will be apparent that the combined pulses constitute a train of binary pulses clocked at the 16 megabits/sec. clock rate. The pulse train is further combined in the transmitter 113 with horizontal and vertical synch signals from the scan generator 21, just as conventional analog video is combined with synch signals on a time-sharing basis. The radio transmitter 113 preferably has sufficient bandwidth to resolve individual pulses of the 16 megabits/sec. binary pulse train, or ideally 8 mc./sec. or more bandwidth.

One or more conventional pulse code relays, 151 of FIG. 6, also having sufficient bandwith to resolve individual binary pulses, may be located in the transmission channel between the transmitter of FIG. 3 and the receiver 153 of FIG. 6, one such relay preferably being at the television receiver video input. The pulse code relay 151 reclocks and reshapes the transmitted binary pulses, effectively erasing unwanted noise or interfering signals in accordance with prior art unless they are present to an excessive degree. The television receiver 153 of FIG. 6 is a substantially conventional receiver compatible with the substantially conventional camera of FIG. 3. Assume for the moment, however, that this receiver has an expanded video bandwidth corresponding to that of the transmitter and that it produces a very fine scanning spot on the picture-tube, in order that the dot matrices of FIG. 4 can be displayed thereon as separate luminous dots.

When one of the leads in the group 28A–G of FIG. 3 has a steady "1" signal, the others meanwhile having "0" signals, one dot matrix will be displayed on the picture tube 63, inasmuch as the scanning beam 67 will be synchronized with the scanning beam 17 of the camera. If more than one output of the analog to digital converter is "1," then the corresponding dot matrices are generated simultaneously, intermeshed each within the others.

TABLE I

| Map Weight | Matrix | | Spacing | | Dots per Unit Area | Fields per Second | Filter Bandwidth |
|---|---|---|---|---|---|---|---|
| | | | Dots | Lines | | | |
| $2^{-1}$ | a'b'c' | ABC | 1 | 1 | 64 | 60 | (4 m.c.) |
| $2^{-2}$ | ace | ABC | 2 | 1 | 32 | 60 | 2 mc. |
| $2^{-3}$ | bdf | ACE | 2 | 2 | 16 | 30 | 2 mc. |
| $2^{-4}$ | bfj | BDF | 4 | 2 | 8 | 30 | 1 mc. |
| $2^{-5}$ | dhl | BFJ | 4 | 4 | 4 | 30 | 1 mc. |
| $2^{-6}$ | dlt | DHL | 8 | 4 | 2 | 30 | ½ mc. |
| $2^{-7}$ | hpx | DLT | 8 | 8 | 1 | 30 | ½ mc. |
| SUM | a a'b | ABC | ½ | 1 | 127 | ---- | ---- |

Table I recapitulates in the second column (headed Matrix) the choice of dots and lines for each of the seven matrices for the system of FIGS. 3 and 4. In the third column, the table shows the relative spacing distance between dots and lines for each matrix, and in the fourth column the relative number of dots per unit area. To simplify the discussion the table illustrates only one complete frame of scanning.

Study of FIGS. 3 and 4 and Table I will show that the sum of all matrices except $2^{-1}$ is a combined matrix almost identical to the $2^{-1}$ matrix; it differs only in being displaced horizontally to lie midway between the $2^{-1}$ dots, and in being deficient in one dot out of sixty-four, the "holes" being arranged in a manner similar to the $2^{-7}$ matrix. When the $2^{-1}$ matrix is added to the sum, the horizontal spacing is merely halved. From another point of view, every dot of the sum matrix belongs to a specific map matrix. As shown, at the bottom of Table I, the sum matrix has 127 dots per unit area. This is the maximum average brightness which can be transmitted; it would, for example, be the uniform raster brightness produced in a receiver when the natural binary coded video signal is .1111111 and remains constant. The binary coded number .1111111 is equivalent to $^{127}/_{128}$ in decimal numerals, the full range video signal.

In like fashion, if the amplified video has constant value of, say, $^{89}/_{128}$ (represented with binary code as .1011001) the $2^{-1}$, $2^{-3}$, $2^{-4}$, and $2^{-7}$ dot matrices would be displayed simultaneously, producing 64+16+8+1=89 dots per unit area.

It is seen therefore that when the camera 13 scans an area, the number of luminous dots generated within the receiver image of the same area and hence its average brightness is proportional to the average video input to the analog to digital converter while scanning the area (at least for large areas such as would occupy a substantial portion of the picture-tube viewing area).

It will be obvious to those skilled in the art that when the TV camera of FIG. 3 scans the stored image 15, binary signals on the leads 28A–G correspond to like-scanned natural-code bit maps of the image, and that the television receiver of FIG. 6 (assumed for the moment to have the ability to resolve individual dots) substantially reproduces the image by generating more or fewer luminous dots in each local area according to whether more or less brightness is required. It will, however, also be seen that the system of FIGS. 3 and 4 may not be able to reproduce brightness exactly in a very small area, for example, an area small in relation to the spacing of the dots of the least significant matrix. More precisely, each bit map is in effect transmitted with a different spatial resolution and in accordance with the teaching of the invention this is tolerable.

Returning now to FIG. 3, filters 29B–G are shown for each bit signal except the most significant and a delay line 29A for the most significant bit. These filters are low-pass filters each having a cutoff frequency related to the dot-sampling frequency with which the binary map signal it transmits is sampled. Assuming 4 mc. analog bandwidth and the scheme of FIG. 3, Table I shows in the last column the cutoff frequency suitable for each filter. Each cutoff frequency is set so that at least two dot sampling pulses per cycle will be available for all frequencies transmitted, thus avoiding frequency-folding and other spurious effects. It is necessary that the filters be constructed to have equal transmission delays. It is assumed that the amplifier 25′ limits the bandwidth of the most significant bit channel, represented by the lead 28A, and therefore only a delay line 29A, having delay equal to that of the filters, has been shown.

The electrical filters 29B–G, operating in the horizontal scan, remove unwanted high spatial frequencies in a horizontal direction, but not in a vertical direction, and are believed adequate for most applications. Isotropic filtering could be provided, if required, by using a scan converter similar to those of FIGS. 1 and 2 in place of each filter. All six write-in and six read-out beams would be deflected simultaneously and alike, but the diameter of the scanning apertures for each converter would be made approximately proportional to the mean separation of dots in the sampling matrix.

Thus far, it has been assumed that the TV receiver 153 of FIG. 6 has very high video bandwidth and very fine spot resolution, so that the dot structure of the matrices is preserved. If the receiver has only the usual bandwidth, such as would adequately reproduce the analog signal produced initially by the camera of the FIG. 3 transmitter, the effect of the high-frequency cutoff on the binary pulse train is to broaden the transmitted binary pulses so that neighboring pulses combine, but the resultant non-binary video signal is substantially equivalent to the binary train insofar as the subjective picture is concerned. With regard to the spot definition, it will readily be appreciated that the picture is not hurt by enlarging the spot diameter until the individual sampling dots cannot be resolved. If the receiver bandwidth is made even lower, the effect is merely similar to that of a low-bandwidth receiver in the reception of a conventional analog television transmission. Thus it is seen that the transmitter of FIG. 3 is compatible with standard television receivers.

When the brightness of an area of the displayed picture depends only on the number of idenical luminous dots generated therein, it is not possible to generate quantized brightness with unequal quantrum steps, such as would be desirable for the best subjective effect. Consequently, the amplifier 25′ of FIG. 3 would be basicaly linear, rather than basically logarithmic in the manner of amplifier 25 of FIG. 1. It would ordinarily be desirable, nevertheless, to introduce non-linearities in amplifier 25′ to render the picture more pleasing by means of artificial effects, corresponding to the conventional use of gamma variation, etc. in television systems. Furthermore, a conventional receiver 153 would not produce a brightness in strict proportion to the number of dots, because individual dots are not resolved and the light generation within the phosphor is not strictly linear with input power. Furthermore, when the bandwidth is too low to preserve the binary pulse train, a video signal with variable amplitude results. All these effects can be utilized with non-linear electrical amplification in the receiver and in transmitter amplifier 25′ to vary somewhat the quantum step sizes.

It will be readily appreciated that the specific embodiment of FIG. 3 may be altered in various ways without departing from the spirit of the invention. For example, the clock rate may be increased thereby increasing the transmitted bit rate, and the bandwidths of the channel and of pulse code relays increased accordingly, but not that of the receiver 153; whereby an improvement in the picture will result, corresponding to the better definition of lower-order bit maps. Alternatively, if the clock rate is made, say 24 million pulses per second, a triple dot spacing *a*, *a′*, *a″*, *b*, *b′*, *b″*, *k*, *k′*, *k″*, etc. may be employed, and the analog to digital converter would have a scale-of-three stage in its most significant digit place, binary stages thereafter. Corresponding to 0 in the ternary place, *k′* and *k″* dots are both absent; and for *l*, *k′* but not *k″* would be transmitted; and for 2, both would be sent. The remaining matrices would correspond to those of FIG. 4, commencing with the $2^{-2}$ matrix and would likewise occupy unprimed letter positions. Such system would likewise provide a binary transmission signal with 24 megabits/sec. rate. It will also be evident that a synchronous de-sampling circuit and digital to analog converter could be used for reception, essentially reversing the function of the system of FIG. 3.

Owing to the conventional two-to-one interlace scanning raster, all dot matrices associated with only alternate lines in the FIG. 3 system will, as shown in Table I, be displayed only once per frame. For certain pictures and viewers, this may produce noticeable flicker. Although various modifications of FIG. 3 may easily be devised to overcome this effect, the applicant prefers the random scan system included in FIG. 5 which, in addition to its other advantages, does not suffer from the effect.

FIG. 5 illustrates a modification of the FIG. 3 embodiment including both the regular sampling of FIG. 3, shown for the $2^{-1}$ bit map, and random sampling, shown for the remaining bit maps. Random sampling is carried out by distributing one-at-a-time sampling pluses among several bit maps in a highly random fashion, while the average number of pulses per second sampling each bit map is controlled to be proportional to the bit weight. FIG. 5 shows one way to generate such random sampling, and other ways will suggest themselves to those skilled in the art. Furthermore, instead of generating the sampling pulse sequence by means of apparatus located in the transmitter, it will often be preferable to prepare beforehand a long program sequence of suitable samples and to record the same in a memory device (such as one including a high-speed magnetic tape loop). On playback, the memory device will function as a sample generator substantially equivalent to combination of units 121, 121′, 129, 131A–G, and 133B–F of FIG. 5 (all shown grouped at the bottom of the figure). Various modifications may also be made to the function of the system of FIG. 5, wholly within the spirit of the invention; for example, even the $2^{-1}$ bit may be sampled randomly, and/or additional bit maps may be sampled in a regular manner.

Comparison of FIGS. 3 and 5 will show that they are the same except for the processing of signals between the analog to digital converter outputs 28 and the output AND gates 143A–G. So far as sampling the $2^{-1}$ bit (lead 28A) is concerned, the two circuits are the same, except that delay 29A and filters 29B to G are not shown in FIG. 5; one-stage counter 131A of FIG. 5 is virtually identical with the first stage 121A of the binary dot counter of FIG. 3. It will therefore be apparent that every other clock pulse from the generator 121 and delay unit 121′ (corresponding to the primed letters of FIG. 4) becomes a $2^{-1}$ dot pulse. Assuming for the time being that lead 28A has a steady "1" output while the remaining bit outputs are all "0," and that the output of FIG. 3 is examined by means of the high definition television receiver assumed while discussing FIG. 3, it will be apparent that the $2^{-1}$ dot matrix of FIG. 4 will be displayed having uniformly spaced dots as in the FIG. 3 system.

Every output signal from the right hand side of counter 131A gates a primed clock pulse through AND gate 143A and also signals the random number generator 129 to generate a new random binary number which is then stored on registers 131B–G. These registers may be flip-flops internal to the generator 129 arranged so that a binary number is readable, in parallel representation, from the right side (marked "1") of each register while its 1's complement is likewise readable from the left side (marked "0"). During each of the remaining intervals (contemporary with unprimed clock pulses) the left (or "0") side of counter 131A puts out enabling signals, and the random generator 129 finds a new random number stored on the registers 131B–G during each successive such interval.

Assuming now that lead 28B is also given a steady "1" signal, AND gate 143B has four active inputs, the clock pulses, the steady "1" bit signal, the signals from the left side of counter 131A, and the right side of register 131B. The left output of 131A enables the gate 143B during intervals including every unprimed clock pulse. If the unit 129 has generated an odd number a "1" is stored in register 131B and the unprimed clock pulse is transmitted through gate 143B, but conversely if an even number has been generated gate 143B blocks the pulse. The high-definition receiver viewing a single frame would consequently show a random arrangement of dots occupying 50% of the uniform horizontal intervals between $2^{-2}$ dots corresponding to 50% of the unprimed dots (using the notation of FIG. 4) selected in random fashion. These interspersed dots constitute a random dot matrix for the $2^{-2}$ bit map.

If the clock pulse frequency has been adjusted to make the dot spacing and line spacing equal for the $2^{-1}$ matrix, the $2^{-2}$ matrix will likewise be isotropic, showing the same kind of randomness vertically as horizontally inasmuch as the randomness is independent of the method of scanning.

If the $2^{-2}$ dot matrix should now be viewed on the high-definition receiver for the duration of several scanning frames, successive frames will be different and after a short while almost all areas of the $2^{-2}$ bit map will have been sampled as completely as the $2^{-1}$ map. For example, only ¼ of the unprimed dot positions remain unsampled after two frames, ⅛ after a period of three frames (corresponding to $1/10$ sec.), $1/16$ after four frames, etc.

The signal fro mthe "0" side of register 131B and the signal from the "0" side of 131A are combined in AND gate 133B, whereby an output from this gate indicates that output AND gates 143A and 143B are both blocked. The 133B output is provided to gate 143C, together with the right hand output from register 131C, which is randomly "0" and "1," and also the converter output and the clock pulse. If the converter output on lead 28C is now made "1," gate 143C transmits clock pulses, in random fashion, during 50% of the intervals during which neither 143A nor 143B conduct, and thereby produces the $2^{-3}$ dot matrix.

In similar fashion, an output is present from gate 133C only when gates 143A, B, and C are all blocked, from 133D when 143D and previous gates are all blocked, and so on, until an output from 133F indicates that all gates except 143G are at the moment blocked.

And in like manner, any succeeding output gate, generally denoted 143K, receives four inputs, viz, the converter output on lead 28K, the clock input, the right hand output from register 131K, and the output of AND gate 133(K–1), which in turn combines the output of 133 (K–2) with the left hand output of register stage 131 (K–1). If, now, the signal on lead 28K is made "1" the dot matrix added to the output during a single frame by transmission through output gate 143K has the same relative number of dots as shown in Table I, but the horizontal and vertical spacings are random and similar, not as shown in the table.

It will be seen that when the camera 13 scans an image 15 having varied brightnesses the bit signals 28 modulate the various dot matrices, and the brightness contribution of each dot matrix is, as with the FIG. 3 system, exactly as required to reproduce the image, degraded only in accordance with the teaching of the invention. Referring again to the system of FIG. 3, we note that vertical and horizontal resolutions are unequal for some dot matrices as shown in Table I, and that only the two most significant bit maps are reproduced at the full rate of 60 fields per second. The remaining bit maps, contributing altogether 25% of the full brightness range, are in only alternate fields whereby flicker might be perceived. By contrast, using the transmitter of FIG. 5, the random matrics are perfectly isotropic and part of every matrix is generated during every field, whereby the field rate is 60/sec. for every bit map. Furthermore, on successive field scans, each dot matrix (except, possibly, $2^{-1}$) is re-generated anew, whereby the average dot spacing (horizontally and vertically) is less over a period of several frames than during a single frame, as explained for $2^{-2}$. Consequently, the longer an immobile picture detail is viewed, the better the definition. In other words, even temporal and spatial resolutions are not independent but their combined effect is varied in accordance with the invention.

Returing now to the random binary number generator 129 of FIG. 5, there are well-known mathematical routines for generating random number sequences on an automatic computer and the incorporation of a general- or special-purpose computer in the system would be feasible, although inconvenient. It is ordinarily preferable in cases of this kind to resort to a "pseudo-random" sequence having finite length and repeated cyclically. For the purpose of FIG. 5, a pseudo-random sequence would preferably be long enough, and have a repetition rate sufficiiently removed from simple-ratio relationship with the television line- and frame-scan frequencies, to give substantially the effect of a truly random sequence of binary numbers.

Further reduction in the size of the equipment required to store a finite-length sequence may be realized by use of sufficiently long so-called shift-register sequences, also known as chain sequences. Such sequences can be designed to be generated over and over again, instead of merely stored. It may also be possible to connect each flip-flop to an independent noise source in such a way that it will be reset randomly on command, independently of its past state and of other flip-flops. Finally, for many applications, it will be more convenient to record and play back cyclically a program of actual sampling pulses, instead of random numbers from which the pulses must be derived with logic circuits.

The form of the invention illustrated by FIGS. 3 through 6 neither requires nor benefits from Gray or other unit-distance coding, inasmuch as all bit maps are scanned simultaneously with the same beams and only the average spacing between accurately positioned dots varies with the bit weight. It will be noted that, in terms of the "high-resolution receiver" assumed for purposes of analysis, all dots are equally sharp and well defined, and the full transmission bandwidth is utilized to assure the exact positioning of each dot within the sum matrix. Therefore, there do not arise problems of registration or of fringe generation in shaded picture areas, such as would occur if a natural code were likewise used in the FIGS. 1 and 2 system. Natural binary code may be decoded with only positive weights, corresponding to 1's of the binary number, and so is easily converted to illumination by addition of dot densities as shown, while dot decoding of Gray Code would be more difficult.

It will be seen that in the dot interlace forms of the invention, the primed dots of FIG. 4 correspond to theoretical resolution elements of the picture, and FIGS. 3 and 5 therefore transmit two bits per element. By modifying the analog to digital converter 27′ to utilize other than strictly radix-two coding, it can be arranged to transmit a different average number of bits per picture element. The transmitted output will still be a binary pulse transmission and compatible with the conventional receiver of FIG. 6. One example has already been given in the discussion of FIG. 3, where it was shown, in effect, that the use of a ternary stage in the most significant digit place would permit sending three bits per element. The random sampling arrangement exemplified by FIG. 5 is even more versatile for such purposes.

Thus, suppose the converter 27' has four ternary stages. Then we may provide eight output gates 143A–H and a sample generator which provides pulses to only one gate at a time in random fashion; the maximum rate of pulses to each of pair 143A and B, one-third the rate to pair 143C and D, one-ninth the rate to 143E and F, and one twenty-seventh the rate to 143G and H. Each stage of the ternary converter 27' is arranged to enable one gate of a pair when it has a "1" output, and both gates of a pair for a "2" output. When the output is "0" both gates are disabled. Thus, the dot density from any pair is proportional to a ternary weight (i.e., $\frac{1}{3}$, $\frac{1}{9}$, etc.) multiplied by 0, 1 or 2 according to the associated converter output digit, and the total density of transmitted pulses will be seen to decode the ternary number. The number of bits (i.e., pulses or dots) transmitted per resolution element is $2(1+\frac{1}{3}+\frac{1}{9}+\frac{1}{27})$ or substantially three in this case also.

More generally, the random dot technique applies for any similar system of coding with weighted bits. Thus, the code viewed as 4-digit ternary above is, alternatively, an 8-bit binary code weighted $\frac{1}{3}$, $\frac{1}{3}$, $\frac{1}{9}$, $\frac{1}{9}$, $\frac{1}{27}$, $\frac{1}{27}$, $\frac{1}{81}$, $\frac{1}{81}$ in the respective bit places; and much less regular weighted codes (including codes having no definite radix) may be employed.

One at a time random pulses can always be obtained in any desired frequency ratios from a long sequence of random numbers ranging between zero and N in value, suitably dividing said value range into sub-ranges or subsets of different size and assigning one sub-range or subset to each output gate 143.

In the case of the FIGS. 1 and 2 system, it has already been pointed out that the bit maps could be transmitted by a frequency-multiplex arrangement. Where one bit map, as shown, requires half the channel capacity, it will be evident that two equal and not necessarily contiguous channels, one for the said one bit map and another for all remaining bit maps, could be used.

In the specific systems illustrated with FIGS. 3 and 5, the $2^{-1}$ map alone may be processed by any equipment capable of handling 8 megabits/sec. or transmitted on a conventional 4 mc./sec. channel, while the remaining bits collectively are likewise processed or transmitted on a separate channel. The two channel signals would be synchronous, and for reproduction of the picture, would be regenerated by two 8 megabits/sec. pulse code relays and then simply added to provide the video.

It will also be observed that if such two-channel transmission is employed for the FIGS. 3 and 5 systems, using two bits per resolution element, addition of the separate 8 megabits/sec. signals provide only three amplitudes, the order of the bits being immaterial. It is therefore possible to transmit (or store) only ternary signals using only 4 mc./sec. bandwidth. One ternary dot would be produced in the receiver for every primed-unprimed dot pair corresponding to systems of FIGS. 3 or 5.

In general, when $n$-1 bits are likewise transmitted per resolution element an equivalent *n-ary* signal requires only 4 mc./sec. Hence, the two discussed dot interlace systems using three bits per element could be transmitted as quaternary signals, and even recoded as 2-bits-per-element signal capable of transmission on only an 8 mc./sec. channel. If so recoded however, a complementary decoder or digital to analog converter would be required at the receiver, while transmitted quaternary pulses would be entirely compatible with a conventional receiver.

The bit maps may represent positively weighted components as in FIGS. 3, 5, and 6, and as shown for illustration only in the patterns of FIG. 2, but also may represent Gray Code components as the patterns of FIG. 1 or various other code components. Such components may exist in two-dimensional bit map form as in actual pictures, illustrated in FIGS. 1 and 2, or merely as signal sequences from the converter, not restored to two-dimensional form until reconstituted at the receiver. More generally in multi-level codes such as ternary, quaternary, etc. the maps would still be digital but involve digit maps with more than two levels. The term weight includes both the absolute numerical value identifying the digit significance and the algebraic sign sometimes determined by the reading of other digits, as in the case of the illustrated Gray Code. Since the eye (and mind) tend to integrate the overall effect of information not actually continuous, a time resolution phenomenon, components not actually simultaneous may be effectively combined.

The term information content normally expressed in bits may be used in various ways to express:

(a) The theoretical absolute minimum if all redundancy could be eliminated (perhaps dependent on processes not yet in existence), or (b) As here intended—the actual number of bits used for processing the signal whether for each still picture or the average per unit time for moving pictures.

Rather diverse embodiments of the invention have already been illustrated, but many other variations will be apparent to those skilled in the art.

What is claimed is:

1. Apparatus for the transmission and reception of pictures comprising; means to periodically sample the amplitude of an analog picture signal and to convert each amplitude sample into a binary number comprising a plurality of bits of different significance; means to produce a different time-variant bit map corresponding to the information in each of said bits; means to transmit the bit map produced by the most significant bit at a given horizontal and vertical resolution; means to transmit the bit maps produced by all of the bits of lesser significance at less than said given horizontal and vertical resolution, some of the bit maps produced by said bits of lesser significance additionally being transmitted at a lower frame rate than said bit map produced by the most significant bit, and receiving apparatus for reconstructing said analog picture signal by combining the bits maps so transmitted.

2. The apparatus of claim 1 wherein said binary number is the Gray code equivalent of each amplitude sample.

3. Apparatus for the transmission of pictures by digital methods with reduced bandwidth, comprising; a source of analog video signals, an analog-to-digital converter connected to said source, whereby said analog picture signals are periodically sampled and converted to binary numbers comprising a plurality of bits of different significance; means to separately apply each of said bits to the write beam of a different one of a plurality of dual-beam scan converters, whereby a bit map is produced for each of said bits; said bit maps having different significance corresponding to the significance of the bits applied thereto; means to scan and transmit the bit map of most significance at a given horizontal and vertical resolution and at a given frame rate; means to scan and transmit all of the bit maps of lesser significance at less than said given horizontal and vertical resolution; and means for additionally scanning and transmitting some of said bit maps of lesser significance at a lower frame rate than said bit map of most significance.

4. The apparatus of claim 3 wherein said scan converters of lesser significance have read-out beams of greater diameter and fewer lines per frame than does the scan-converter of most significance, whereby the horizontal and vertical resolutions of said scan converters of lesser significance are reduced.

5. Apparatus for the transmission and reception of pictures comprising; a transmitter and receiver; means at said transmitter to periodically sample the amplitude of an analog video signal and to convert said amplitude samples to a sequence of binary numbers each comprising a plurality of bits of generally different significance; a channel of given capacity connecting said transmitter and receiver; means for separately transmitting over said channel selected bits from each sequence of bits of the same significance, the sequence of bits of most significance occupying the greatest portion of said channel capacity, with progressively smaller portions of said channel capacity being occupied by the sequences of bits of lesser significance, and means at said receiver for reconstructing said pictures from said sequence of bits, said selected bits being chosen for their effect in producing a reconstructed picture of high subjective quality.

6. The apparatus of claim 5 wherein said digit maps are time-variant and at least one of the said digit maps of different significance is transmitted less frequently than is said digit map produced by said digit map of given significance.

7. The apparatus of claim 6 wherein additionally at least one of said remainder of said bit maps is transmitted with lower temporal resolution than is said given one of said bit maps.

8. Apparatus for the transmission and reception of pictures, comprising; means to sample the amplitude of an analog picture signal and to convert each amplitude sample into a digital number comprising a plurality of digits of different significance; means to produce a different digit map corresponding to the information in each of said digits; means to transmit the digit map produced by a digit of given significance at a given horizontal and vertical resolution; means to transmit at least one of the digit maps of a different significance at less than said given horizontal and vertical resolution, and receiving apparatus for reconstructing said analog picture signal by combining the digit maps so transmitted.

9. Apparatus for the transmission and reception of pictures, comprising; a transmitter and a receiver; means at said transmitter to convert said picture into a plurality of time-variant maps each representing a fraction of the brightness range of said picture, the significance of each of said bit maps corresponding to the fraction of the brightness range represented thereby, the sum of the brightness values at corresponding points of all bit maps being equal to the brightness at that point on said picture; means to transmit a given one of said bit maps with a given horizontal and vertical resolution; and means to transmit at least one of the remainder of said bit maps with a lower horizontal and vertical resolution, said receiver comprising means to reconstruct said picture by combining said bit maps.

References Cited

UNITED STATES PATENTS

| | | | |
|---|---|---|---|
| 2,629,010 | 2/1953 | Graham | 178—6 |
| 2,629,011 | 2/1953 | Graham | 178—6 |
| 2,940,005 | 6/1960 | Toulon | 178—6 |
| 2,996,574 | 8/1961 | Tobey | 178—6 |
| 3,175,154 | 3/1965 | Guanella | 325—38 |
| 2,752,421 | 6/1956 | Ross | 178—6 |
| 2,850,574 | 9/1958 | Kretzmer | 178—6 |
| 2,963,551 | 12/1960 | Schreiber et al. | 179—15.55 |
| 3,006,991 | 10/1961 | Cherry et al. | 179—15.55 |

OTHER REFERENCES

Proceedings of IRE, September 1960; "T.V. Transmission by Binary Pulses," by R. L. Carbrey, pp. 1546–1562.

ROBERT L. GRIFFIN, *Primary Examiner.*

DAVID G. REDINBAUGH, JOHN W. CALDWELL, *Examiners.*

T. G. KEOUGH, J. A. ORSINO, *Assistant Examiners.*

UNITED STATES PATENT OFFICE

CERTIFICATE OF CORRECTION

Patent No. 3,377,423 April 9, 1968

Bernard Lippel

It is certified that error appears in the above identified patent and that said Letters Patent are hereby corrected as shown below:

Column 3, line 75, "are" should read -- or --. Column 6, line 6, "the" should read -- that --. Column 13, line 11, "3" should read -- 13 --. Column 19, line 23, "$2^{-2}$" should read -- $2^{-1}$ --. Column 23, line 15, "6." should read -- 7. --; same line 15, claim reference numeral "5" should read -- 6 --; line 20, "7." should read -- 9. --; same line 20, claim reference numeral "6" should read -- 8 --; line 24, "8." should read -- 6. --; line 37, "9." should read -- 8. --.

Signed and sealed this 3rd day of February 1970.

(SEAL)

Attest:

Edward M. Fletcher, Jr.
Attesting Officer

WILLIAM E. SCHUYLER, JR.
Commissioner of Patents